June 19, 1928.
W. STEGER
1,674,487
AUTOMOBILE DOOR WINDOW
Filed Nov. 21, 1925
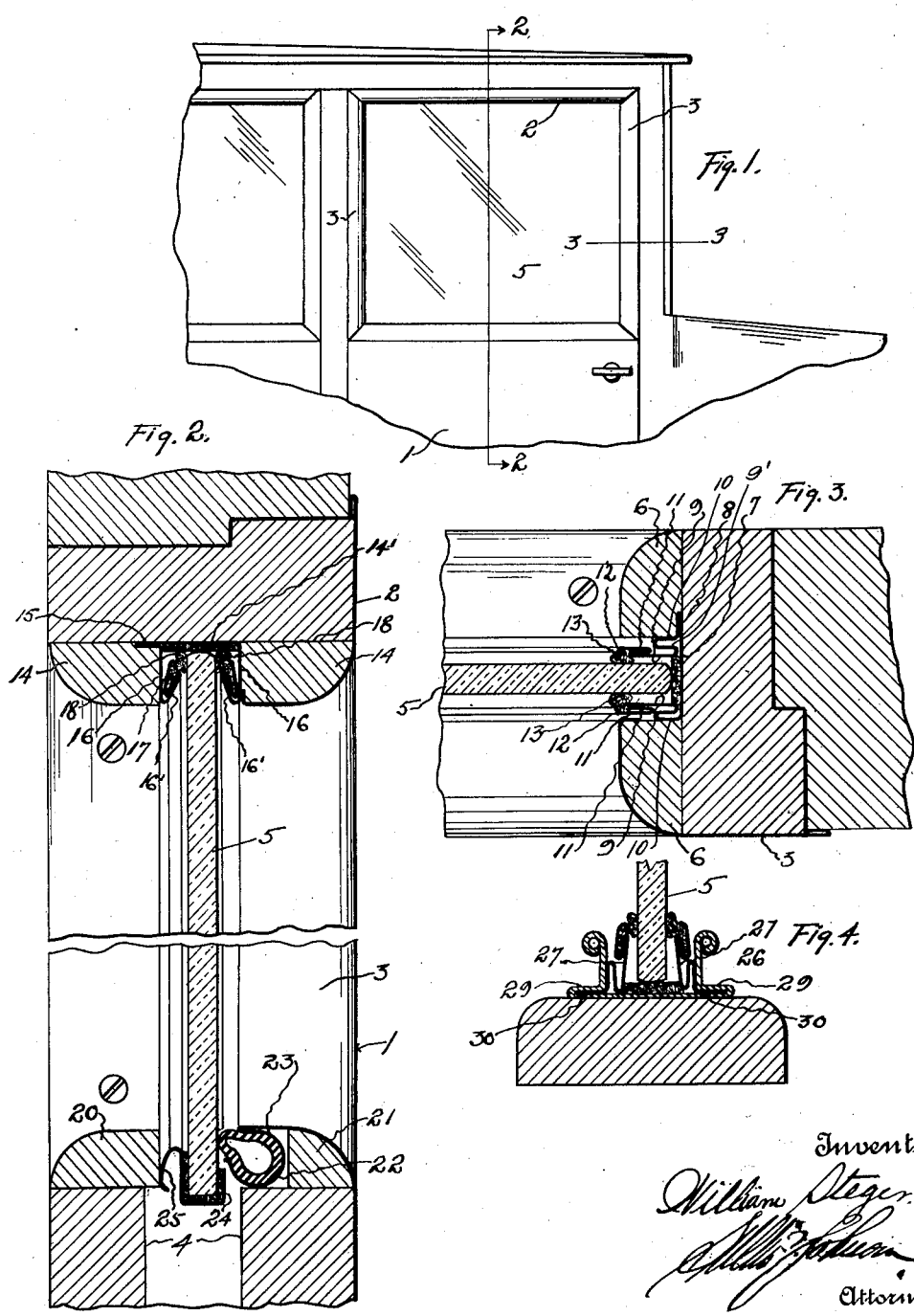
Inventor
William Steger
Attorney Patented June 19, 1928.

1,674,487

UNITED STATES PATENT OFFICE.

WILLIAM STEGER, OF COLUMBUS, OHIO.

AUTOMOBILE DOOR WINDOW.

Application filed November 21, 1925. Serial No. 70,491.

The present invention is directed to improvements in automobile door windows and is an improvement on my Patent No. 1,498,406 issued June 17, 1924.

The primary object of the invention is to provide a device of this character constructed in such manner that the window panes will be held firmly in their open or closed positions and if subjected to shocks the jar incident thereto will be absorbed, consequently eliminating breakage.

A further object of the invention is to provide a window construction which can be easily and quickly installed, will positively prevent entrance of water, dust or other elements, and will eliminate rattling.

With these and other objects in view, this invention resides in the novel features of construction, formation, combination and arrangement of parts to be hereinafter more fully described, claimed and illustrated in the accompanying drawing, in which—

Figure 1 is a fragmentary side elevation of an automobile, showing the device in place thereon.

Figure 2 is a sectional view on line 2—2 of Figure 1.

Figure 3 is a sectional view on line 3—3 of Figure 1.

Figure 4 is a sectional view of a modified form of the invention.

Referring to the drawing, 1 designates the door of an automobile of the closed type which as usual consists of upper rails 2, side rails 3 and lower spaced members 4, the panes 5 when slid downwardly moving in the space between said members.

Suitably fixed to the side rails 3 are moldings 6 spaced to accommodate the side edges of the pane 5. In order to retain the pane 5 in proper position between the moldings 6 of the side rails sheet bronze plates 7 are provided, the inner longitudinal edges thereof being reversely bent to rest upon the plates 7 to constitute flanges 8 which extend under the adjacent molding 6, said flanges being secured to the rails 3 in any suitable manner. The reversely bent portions of the flanges 8, as well as the outer longitudinal edges of the plates 7 terminate in channel members consisting of inner and outer webs 9 and 10, resiliently connected by a web 9′, thus providing a construction S-shaped in cross-section. The webs 9 terminate in plates 11 which plates 11 are reversely bent to provide channel members 12 in which, by crimping, the felt strips 13 are firmly secured, said strips being engaged with the opposite faces of the panes 5, and owing to the S-shaped cross-sectional formation of the webs 9 and 10 said strips will yieldably engage the pane. It will be observed that the outer webs 10 rest against the adjacent sides of the respective moldings 6 which form an abutment therefor.

The upper rail 2 has also suitably secured thereto laterally spaced moldings 14, there being a plate 14′ and flange 15, similar to the plate 7 secured to said rail. This plate and flange 15 terminate in flanges 16, which rest against the respective moldings 14, said flanges having their longitudinal edges terminating in reversely bent portions 16′ and terminal flanges 17 which constitute channel members in which are gripped the felt strips 18 for engagement with the opposite sides of the pane 5 when in its closed position, there being a felt strip 19 secured to the plate 14′ for engagement with the upper edge of the pane.

The members 4 have secured thereto moldings 20 and 21, the former having its inner edge extended slightly beyond the inner face of the associated member, the purpose of which will appear later. The molding 21 has connected thereto a tubular casing 22 and mounted in said casing is a tubular rubber member 23, and like in my former patent constitutes a "squeegee".

Suitably fixed to the lower edge of the pane 5 is a channel member 24, the inner web of which terminates in a resiliently connected plate 25 which serves when the pane is in its closed position to yieldably urge said pane into engagement with the "squeegee" 23, thereby preventing the entrance of water to the space between the members 4. Since the molding 20 extends inwardly it will be obvious that the plate 25 will be forced outwardly to cause the pane to engage the "squeegee", and will be held thus as long as the pane is in its closed position. In this manner complicated devices are eliminated to prevent entrance of water or other elements.

It will be apparent that the pane 5 may be readily raised or lowered by any approved mechanism and that should the pane, when closed, be subjected to jars or pressure from either side, the shock incident thereto will be absorbed by the webs 9 and 10 at the sides, the portions 16 and plates 17 at the top and the plate 25 and "squeegee" 23 at the lower end. When the pane is partially open, the shock will be principally absorbed by the webs 9 and 10 and due to the S-shaped formation thereof sufficient resistance is offered to withstand considerable shock since the shock will be first imparted to the plates 11 and then absorbed by the resiliently connected webs 9 and 10. Because of the fact that spring bronze is used, the return of the parts to their normal positions after being subjected to shocks is assured.

In the modified form of the invention, as shown in Figure 4, a metallic molding member 26 is employed, which may be used in lieu of the moldings 6 and 14, and since the plates 27 and their associated webs are similar to the webs 9 and 10, a detailed description of the same is not thought necessary. It will be observed, however, that the plates 27 are provided with flanges 30 upon their longitudinal edges, said flanges being clamped within the folds 29 of the molding 26. Since the two sets of webs 9 and 10 are arranged to enable the edge of the pane to lie therebetween shock to the pane will be effectively absorbed thereby.

From the foregoing description it is thought that the construction, operation and many advantages of the herein described device will be apparent to those skilled in the art without further description.

What is claimed is:—

1. A glass pane runway including a plate for attachment to a window frame, each side edge of the plates terminating in laterally spaced resiliently inter-connected webs providing a construction S-shaped in cross-section, said webs being angularly disposed with respect to the plate and capable of engaging the face of a pane adjacent the edge thereof when said pane is moved abnormally in lateral directions.

2. A glass pane runway including a plate, moldings mounted upon the opposite sides thereof, said plate having its side edges terminating in inner and outer webs, said webs being resiliently inter-connected by an intermediate web to provide a construction S-shaped in cross section, the outer webs being intimately engaged with the moldings, the inner webs having plates resiliently connected thereto and having felt strips carried thereby, a pane slidable between the strips and intimately engaged therewith, said pane being engageable with the inner webs only when abnormal lateral movement is imparted to the pane.

In testimony whereof I affix my signature.

WILLIAM STEGER.